United States Patent
Khorram et al.

(10) Patent No.: US 6,720,757 B2
(45) Date of Patent: Apr. 13, 2004

(54) VARIABLE GAIN RECEIVED SIGNAL STRENGTH INDICATOR

(75) Inventors: Shahla Khorram, Los Angeles, CA (US); Shan Jiang, San Gabriel, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 10/106,910

(22) Filed: Mar. 26, 2002

(65) Prior Publication Data

US 2003/0184277 A1 Oct. 2, 2003

(51) Int. Cl.[7] .................... G01R 17/22; G01R 31/00; H04B 17/00
(52) U.S. Cl. .................... 324/76.14; 324/103 P; 324/96
(58) Field of Search ............... 324/76.14, 96, 324/103 P, 119, 115, 99 D; 455/226.2, 226.4, 20; 340/539.21

(56) References Cited

U.S. PATENT DOCUMENTS

| | | | | |
|---|---|---|---|---|
| 4,004,220 A | * | 1/1977 | Kerber et al. | 324/103 P |
| 4,603,331 A | * | 7/1986 | Wehner | 342/192 |
| 6,242,901 B1 | * | 6/2001 | Faick et al. | 324/95 |
| 6,321,073 B1 | * | 11/2001 | Luz et al. | 455/239.1 |
| 6,407,540 B1 | * | 6/2002 | Shepherd | 324/95 |
| 6,442,378 B1 | * | 8/2002 | Aboukhalil et al. | 455/115.3 |

* cited by examiner

Primary Examiner—Anjan K. Deb
(74) Attorney, Agent, or Firm—Bruce Garlick; Robert Strowbrich

(57) ABSTRACT

An RSSI circuit provides a relatively inexpensive technique for accurately measuring received signal strength over a wide dynamic range. A received signal is processed by a rectifier circuit that generates a series of DC offsets of increasing magnitude. The DC offsets are imposed on a first polarity of the received signal to create a series of outputs that are the first polarity of the received signal with increasing DC offsets. Each of the outputs is coupled to one input of a weighted comparator with the other input of the comparator coupled to a second and opposite polarity of the received signal with no offset. The comparators determine when overlap occurs to indicate particular signal levels.

22 Claims, 5 Drawing Sheets

VARIABLE GAIN RECEIVED SIGNAL STRENGTH INDICATOR

BACKGROUND OF THE INVENTION

1. Field of the Invention

This invention relates to the field of signal transmission and reception over a network, and more particularly to the determination of the strength of a received signal.

2. Description of the Related Art

A data communications network typically transmits information between at least one sender and one receiver. For full duplex communication, the sender is also a receiver and the receiver also a sender. The circuitry combined to perform both functions is typically called a transceiver. All communications networks have some noise present within them, and often the noise varies in magnitude over time, depending upon a number of environmental factors. Thus, all signals sent from a transmitter to a receiver (or from one transceiver to another) within a network must have sufficient magnitude (i.e. strength) such that the receiver is capable of discriminating between the transmitted communication signal and the noise that may be present in the network. Wireless networks tend to be more susceptible to noise than are wired networks. One reason is that wireless transceivers are often mobile (e.g. cellular telephones) with respect to base stations with which they communicate. Additionally, because the signals are transmitted through air, environmental factors such as the distance between the transceivers (i.e. the cellular phone and the base station) and the existence of obstacles such as trees and buildings in the signal path can affect the strength of the received signal, as well as the noise levels that may be present in the wireless network.

Another example of a wireless network is one based on the Bluetooth standard, which is designed to facilitate short-range (i.e. 30 to 60 feet) wireless communication between terminal equipment such as PC's, laptops, printers, faxes, and hand-held devices such as PDAs (personal digital assistant). The Bluetooth defines a standard by which devices such as the foregoing transmit and receive signals using the ISM (industrial, scientific and medical) radio band of 2.4 GHz. This standard has been established to promote the networking of such devices through compatible transceivers so that they may communicate with one another without need for physical interconnection through proprietary cables. The noise and signal strength issues for a Bluetooth wireless network are analogous to the cellular telephone network, albeit over much shorter distances.

It is known in the art that the real-time measurement of the strength of received signals in networks can provide very useful control information for the network. For example, the signal strength of a signal received from a remote transceiver can be used to notify the remote transceiver to boost or attenuate the output strength of its transmission to compensate for conditions affecting the transmitted signal prior to its reception. The received signal strength (RSS) as measured at a receiving transceiver has also been used to boost or attenuate the transmitted power of its own signal transmissions back to the transceiver that is the source of the measured signal. This ensures that the gain of the return signal is adjusted to offset any noise and/or signal attenuation (or absence thereof) experienced by the received signal. Received signal strength has also been used to determine when communication with a mobile cellular telephone should be handed off to a different cell to provide better transmission, due to, for example, its closer proximity and/or better transmission path.

Numerous methods and circuits have been disclosed for measuring received signal strength, commonly known as an RSSI (Received Signal Strength Indication). Prior such methods and circuits typically involve detecting the peak amplitude of the received signal and averaging the values over some period of time. The implementation of this process typically involves rectifying the input signal using a series of rectifiers, and then sampling the rectified input signal and converting the samples from analog to digital values using A/D (analog to digital) converters. To perform these measurements accurately and over the desired dynamic range of the input signal, a significant number of rectifiers are required and the requisite A/Ds are expensive. Moreover, at the low end of the dynamic range, the peaks may be too small to be discernable over the noise present in the network. Finally, while such RSSI techniques endeavor to provide a measure of the received signal strength at the antenna of the receiver, they do not take into consideration the effect that components internal to the transceiver might have on the signal before the RSSI circuit can perform its measurement.

Therefore, it would be desirable to provide an RSSI method and apparatus that compensates for the variations in the transceiver components that can affect the received signal prior to measurement of the RSS. It would also be desirable to provide an RSSI method and apparatus that is capable of measuring the received signal strength with accuracy and over the requisite dynamic range without the need for a large number of rectifiers and expensive A/D circuits. Finally, it would desirable for the RSSI method and apparatus to have the capability to measure the received signal strength notwithstanding that noise is present in the system that otherwise obscures the received signal from conventional peak detection at low ends of the dynamic range of the received input signal.

SUMMARY OF THE INVENTION

One embodiment of the method of the invention for measuring the strength of a received signal involves generating a plurality of DC offsets of increasing value and imposing each of the offsets on a first polarity of the received signal. By determining when each of the offsets is overcome by the amplitude of the received signal, an indication of the strength of the received signal is provided as the greatest of the plurality of offsets overcome by the amplitude of the received signal. In one embodiment, the offsets are determined to have been overcome by the amplitude of the received signal by comparing a first polarity of the received signal for each imposed offset with a second polarity of the received signal to identify when the amplitude of the first polarity exceeds the amplitude of the second polarity.

One embodiment of the apparatus for measuring the strength of a received signal includes a rectifier circuit that further includes an offset circuit having an input for receiving a first polarity of the received signal and producing a plurality of outputs each comprising the one polarity of the received signal added to one of a plurality of unique DC offsets of increasing value. The rectifier circuit further includes a plurality of comparator circuits each having a first input for receiving one of the plurality of outputs of the offset circuit, a second input for receiving a second polarity of the received signal, and an output that is inactive when the amplitude of the signal on the second input is greater than the amplitude of the signal on the first input and active when the amplitude of the signal on the first input is greater than the amplitude of the signal on the second input. The strength of the received signal is thereby indicated by the active outputs of the comparators to be the greatest of the plurality of offsets overcome by the amplitude of the received signal.

In another embodiment of the apparatus, the plurality of DC offsets increases by a step increment equal to the total dynamic range of the received signal in dB divided by the number of the plurality of offsets. In another embodiment, the rectifier circuit is divided into two or more rectifier sub-circuits each having its own offset sub-circuit that generates a portion of the plurality of offsets and a portion of the plurality of comparators. The first polarity of the received signal is coupled to the offset sub-circuit of at least one of the rectifier sub-circuits, and the second polarity of the received signal is coupled to the second input both of which can be amplified by a predetermined gain.

In another embodiment, the received signal is coupled to a variable gain amplifier, the gain of which can be programmed to compensate for the variation in gain supplied by various signal processing components through which the received signal is transmitted before reaching the rectifier circuit. In a still further embodiment, the received signal is down-converted from an RF signal to an IF signal prior to being received by the rectifier circuit.

BRIEF DESCRIPTION OF THE DRAWINGS

The RSSI method and apparatus of the invention may be better understood, and its numerous objectives, features and advantages made apparent to those skilled in the art by referencing the accompanying drawings. The use of the same reference number throughout the several figures designates a like or similar element.

FIG. 3a illustrates one instantiation of the rectifier of the RSSI of the present invention FIG. 3b illustrates the relative values of the two polarities of the input signals to the weighted comparators of FIG. 3a.

DETAILED DESCRIPTION

Overview

Figure 1:
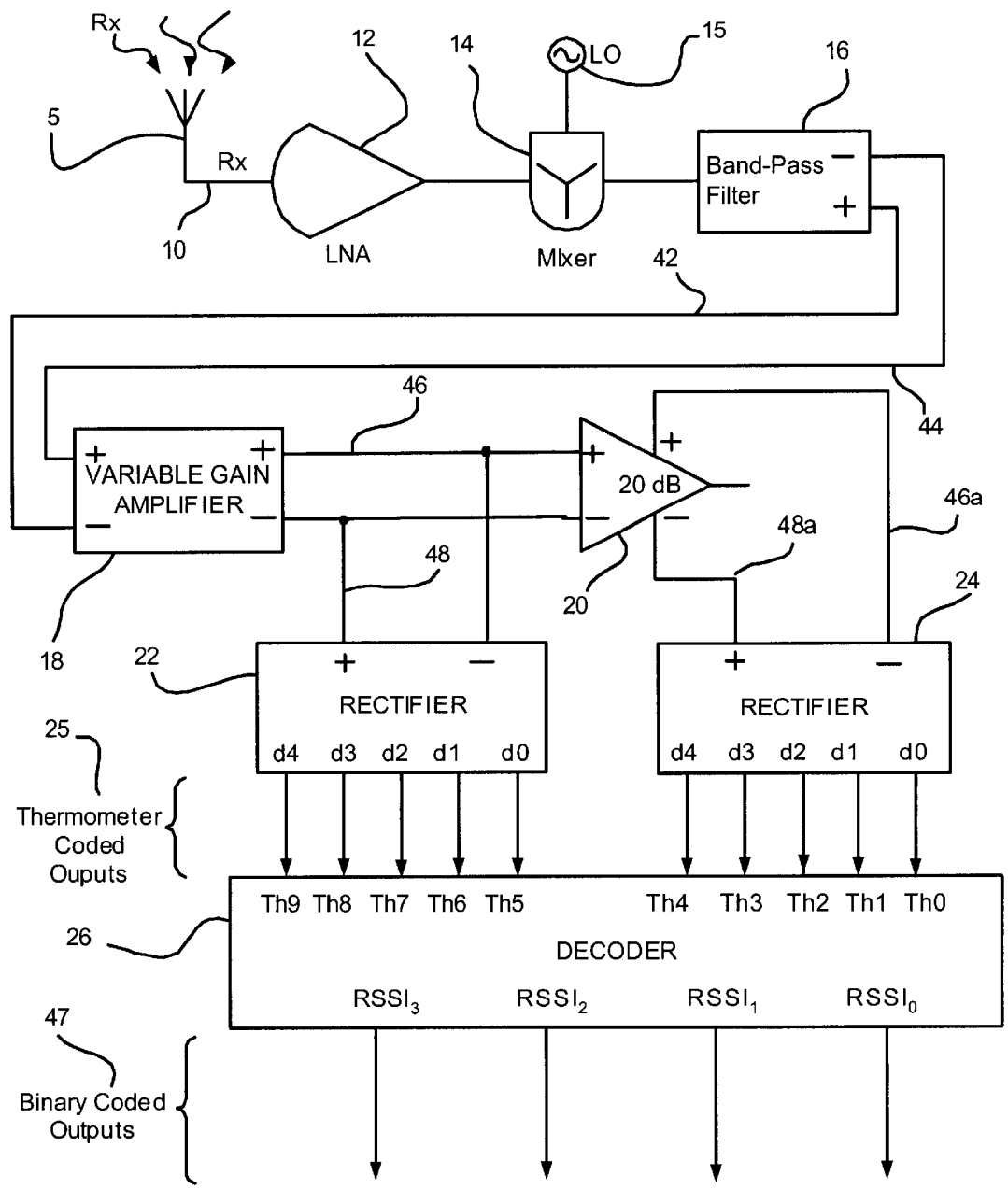
FIG. 1 illustrates a block diagram representation of the RSSI of the present invention within a receiver or transceiver.

The RSSI method and apparatus of the invention provides a relatively inexpensive technique for accurately measuring received signal strength over a wide dynamic range. In one embodiment, a received signal is processed by a rectifier circuit that generates a series of DC offsets of increasing magnitude. The DC offsets are imposed on a first polarity of the received signal to create a series of outputs that are each a summation of the first polarity of the received signal and one of the DC offsets. The rectifier circuit also has a plurality of comparators equal to the number of outputs having offsets that are generated. Each comparator receives one of the outputs having an offset at a first input. Each comparator receives at a second input the received signal having a second polarity that is opposite of the first polarity. In one embodiment, no offset is imposed on the signal of the second polarity.

Each comparator indicates with an inactive low output that the signal of the second polarity is greater in amplitude than the signal it receives of the first polarity, which has been offset. The comparators indicate with an active high output that the amplitude of the first polarity has at some point exceeded the amplitude of the signal of the second polarity, which also indicates that the amplitude of the received signal has overcome and is therefore greater than the offset applied to the signal of the second polarity for that comparator. Thus, the received signal strength is indicated by the comparator outputs to be greater than the largest DC offset that has been overcome, and less than any DC offsets not yet overcome. In one embodiment, the comparators are weighted so that an active high is triggered at the moment the amplitude of the signal of the second polarity exceeds the amplitude of the first polarity, but does not immediately become inactive when the first polarity again exceeds the signal of the second. This hysteresis prevents the output of the comparator from switching with every reverse in the magnitude of the signals, particularly when the magnitude of the received signal is approximately equal to the offset.

The offsets can be made to increase from zero by a step increment measured in dB that is equal for all offsets and thus equal to the total dynamic range in dB of the received signal divided by the number of offsets. The resolution can therefore be increased by simply generating more offsets. The rectifier circuit can be broken into two or more sub-circuits each of which is allocated to a portion of the dynamic range. The received signal can be amplified for the sub-circuit(s) allocated to the lower portions of the dynamic range to increase the ability of the rectifier sub-circuit to detect the point at which the offset polarity exceeds the non-offset polarity over noise that may be present in the system. A variable gain amplifier can be used to adjust the gain of the received signal to compensate for the gain that may be introduced by amplifiers and down-conversion circuits that may reside in the receive signal path prior to the RSSI.

In another embodiment, at least two rectifiers are employed each of which are dedicated to handle a different portion of the dynamic range of the received input signal and that together combine to sufficiently cover the entire dynamic range of the received input signal. In one embodiment, each rectifier receives both polarities of the received input signal. The levels of the received input signal provided to the rectifier dedicated to the lower portion of the dynamic range (that may be obscured by noise present in the system) are first amplified to increase the relative amplitudes between the noise and the input signal levels to permit detection of the peaks at the lowest level of the input signal's dynamic range.

In one embodiment of the RSSI, a variable gain amplifier (VGA) is employed to compensate for variations in the gain of the receiver's linear amplifier (LNA), as well as variations in the gains of the circuits used to perform signal processing on the received signal prior to its transmission to the rectifier circuit, such as when a down-conversion of the received input signal is require for wireless applications to convert the received signal from an RF (radio frequency) to an IF (intermediate frequency) signal. In one embodiment, the RSSI circuit is employed on the same integrated circuit (IC) as the receiver. The VGA can be temporarily or permanently programmed using an n-bit word to provide gain sufficient to compensate for variations in the gains of the LNA as well as the gain introduced by the components performing the down-conversion of the received signal from RF to IF.

The RSSI of the present invention therefore provides a low-cost yet accurate technique by which to measure the signal strength of a received signal over the entire dynamic range of the input signal, even at the low end of the range which might otherwise be obscured by noise present in the system. Variations in the gain of the receiver's LNA and variations in the down-conversion components caused by variations in the manufacturing process of a monolithic transceiver can be compensated by programming the variable gain amplifier during device test or characterization. The RSSI of the invention is advantageous because it eliminates the need for expensive and accurate A/D converters, and eliminates the problem of trying to detect peaks at the low end of the dynamic range, which are often obscured by noise, particularly in a wireless network environment. The low-cost nature of the RSSI of the present invention makes it ideally suited for low-cost networking applications.

Topology

A detailed description of one embodiment of the RSSI of the present invention is illustrated in FIG. 1. A received signal $R_x$ is received at input 10. For a wireless network, the signal is typically received at input 10 using an antenna 5 as shown. Also for wireless applications, the received signal Rx is typically received as an RF (radio frequency) signal that is first amplified by linear amplifier (LNA) 12. The received RF signal is then typically down-converted from its RF frequency to an IF frequency using mixer 14. For example, in a Bluetooth application, the received RF signal is typically modulated at an RF frequency of between 2.4 and 2.48 GHz. The received signal is then down-converted to an IF frequency of about 2 MHz. This can be accomplished as shown in FIG. 1 by mixing the received RF signal $R_x$ 10 with a local oscillator signal LO 15 having a frequency of about 2.42 MHz using mixer 14. Band-pass filter (BPF) 16 is then typically employed to filter out unwanted additional frequency components (e.g. upper sideband and harmonics) that are generated by the mixing process. The output of BPF 16 can be used to produce a positive and negative polarity of the down-converted received input signal. In one embodiment, LNA 12 may provide about 20 dB of gain, the mixer may provide an additional 8 dB of gain, and BPF 16 could provide another 20 dB of gain in the pass-band. All of these gains may, of course, vary considerably based on the actual design, as well as process variations in the manufacturing process.

Figure 2:
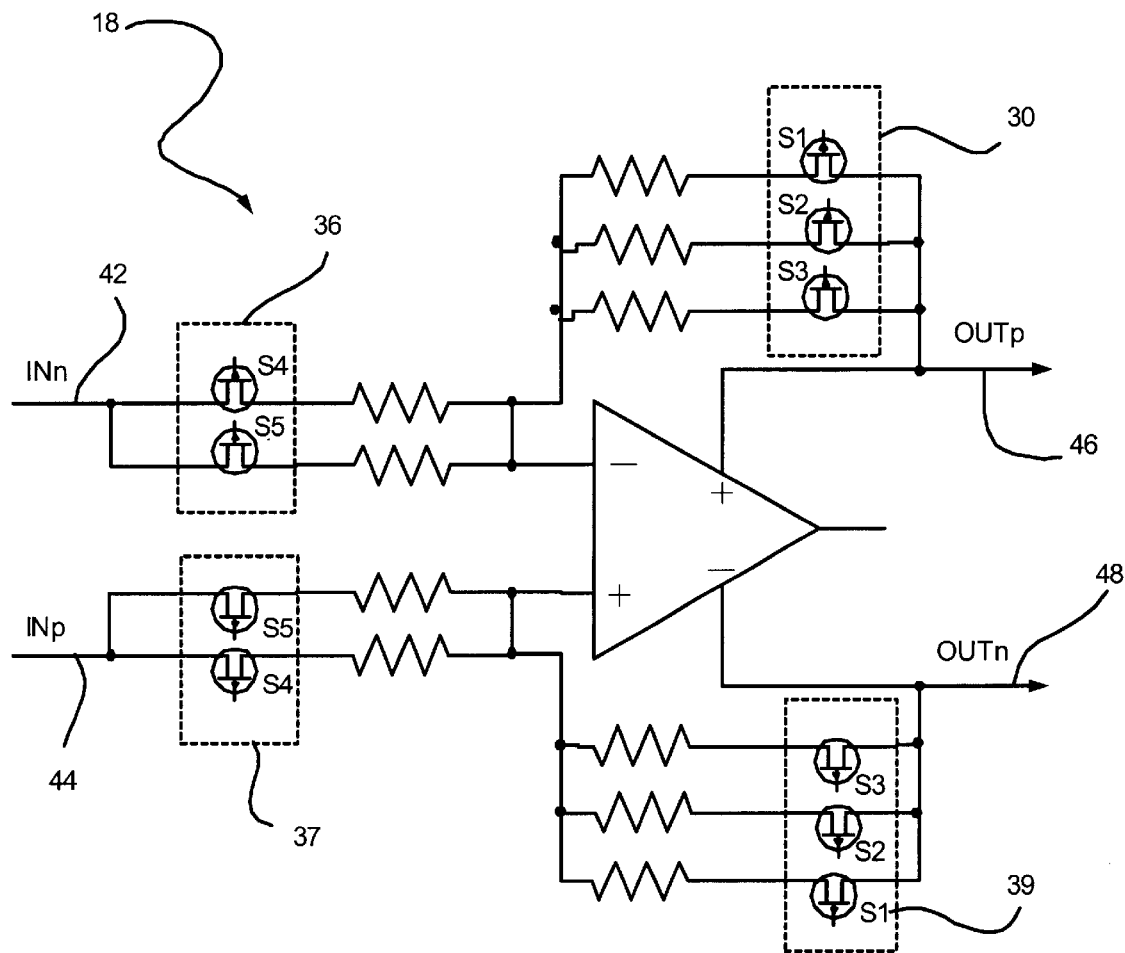
FIG. 2 illustrates a known variable gain amplifier structure.

In one embodiment of the RSSI of the invention, a programmable variable gain amplifier (VGA) 18 is employed, which can be programmed digitally to compensate for the variation in gains associated with the components described above. FIG. 2 illustrates one possible programmable VGA circuit that can be employed to accomplish the desired compensation. Other known programmable VGA circuits can also be substituted therefore without exceeding the intended scope of the invention disclosed herein. The VGA 18 can be temporarily or permanently programmed with an appropriate combination of binary bits stored for example, in a memory device, to control its various switches to achieve the desired compensatory gain. Each of the binary bits is presented to one or more switches from each group of switches 30, 36, 37 and 39 to connect one or more resistors with which the switches are in series into the signal path of the amplifier. The negative polarity of the received input signal is coupled to input $IN_n$ 42 and the positive polarity is coupled to $IN_p$ 44. Due to the inverting nature of the amplifier, the positive polarity of the amplified signal is seen at $OUT_p$ 46 and the negative polarity of the amplified signal is seen at $OUT_n$ 48. The appropriate value of the programming bits is dictated by those values of the impedances required to achieve the appropriate level of compensatory gain. The requisite gain value for VGA 18 can be derived based on, for example, test measurements made for each individual receiver, or from the characterization of a sampling of such circuits.

It will be obvious to those of skill in the art that the received input signal $R_x$ 10 may or may not be down-converted, depending upon the application. For example, if the network is a wired and not a wireless network, the signal will not have to be down-converted because it would not be transmitted as an RF signal. Moreover, the use of a VGA to compensate for variations in signal gain may or may not be desirable depending upon the application. Thus, while the balance of this description is made with reference to an embodiment that employs a down-conversion on the received input signal and that employs a VGA to compensate for the gain introduced by the elements used to perform the down-conversion, it is to be understood that the RSSI of the present invention can also be employed with or without a down-conversion and with or without a VGA. Therefore, unless otherwise stated to the contrary, any reference to the received input signal henceforth is intended to describe the received input signal $R_x$, whether down-converted or not, and whether gain compensated or not.

In a further embodiment of the RSSI of the invention, the positive and negative polarities of the received input signal are transmitted over lines 42 and 44 respectively either through the up-conversion components and/or the VGA as previously described, or to the negative and positive inputs 46 and 48 respectively of rectifiers 22 and 24. In one embodiment as described in FIG. 1, the dynamic range over which the strength of the received input signal is apportioned between two rectifier blocks 22 and 24. In this embodiment, rectifier sub-circuit 22 is used to process the upper half of the dynamic range of the received input signal, while rectifier sub-circuit 24 is used to process received input signals at the lower end of the received input signal dynamic range. For example, in a Bluetooth application, it is desirable that an RSSI detect signal power levels over a 40 dB dynamic range with a resolution of approximately 4 dB. In this case, rectifier block 22 can be used to rectify signals over the top half of the dynamic range (e.g. 40 millivolts to 400 millivolts). Rectifier block 24 can be made identical to rectifier 22 internally, but handle the bottom half of the dynamic range (e.g. 4 millivolts to 40 millivolts) by amplifying the received signal through amplifier 20 having a gain of 20 dB.

To achieve the desired resolution of 4 dB, each rectifier sub-circuit in the embodiment of FIG. 1 has five thermometer coded output bits d0 through d4. Thus, if only outputs d0 and d1 of rectifier sub-circuit 24 are active, the amplitude of the received signal is between 8 and 12 dB. If outputs d0 through d4 of rectifier sub-circuit 24 are active, and outputs d0 through d2 of rectifier sub-circuit 22 are active, the received input signal has an amplitude of between 32 and 36 dB. In a further embodiment, digital decoder 26 converts the 10 bit thermometer coded outputs of rectifier sub-circuits 22, 24 into a 4 bit binary output 47 ($RSSI_0$ through $RSSI_3$), which can be used to control other elements based on the binary value of the strength of the received input signal. Those of skill in the art will recognize that the RSSI of the invention can be easily adapted to any desired dynamic range and resolution of that dynamic range by adding additional rectifier sub-circuits and/or output bits (i.e. offsets) per rectifier.

Figures 3A, 3B:
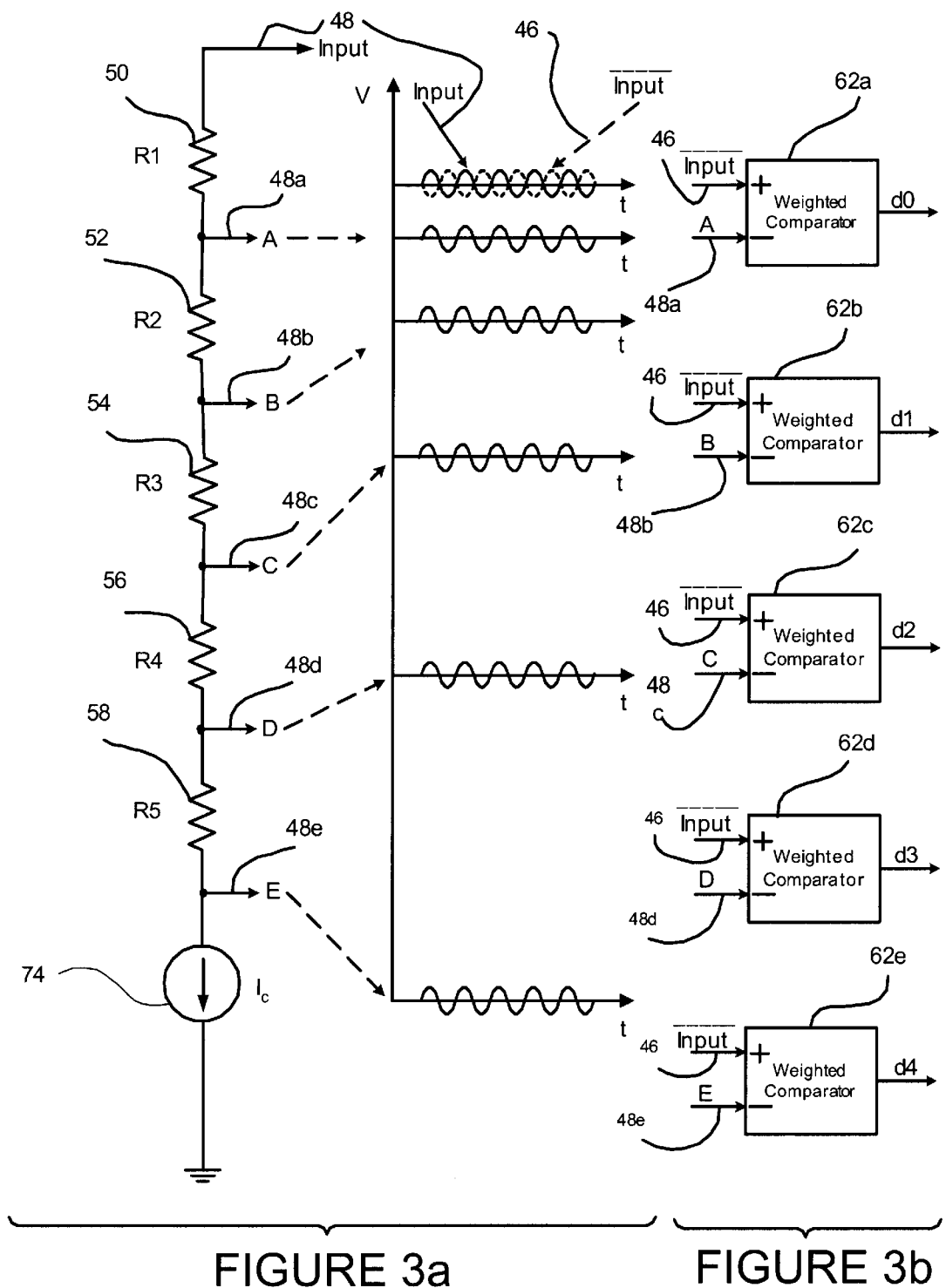

FIGS. 3a and 3b illustrate one embodiment of the rectifier sub-circuits 22, 24 of FIG. 1. As illustrated in FIG. 3a, the positive polarity of the received input signal 48 is fed into a resistor ladder that adds a negative 4 dB DC of offset to the signal for each resistor R1 50 through R5 58 in the ladder.

Those of skill in the art will recognize that if finer resolution is required, additional resistors having the requisite values to produce smaller increments of DC offset can be added. Thus, output 48a has been offset by a negative 4 dB from the DC level of the positive polarity of the received signal 42, output 48b by 8 dB and so on to output 48e, which is offset by a negative 20 dB. The offset is created by the DC current source 60 that pulls a constant DC current through the resistor ladder. The signal representations of each output 48a–e in FIG. 3a illustrate the logarithmic relationship of the 4 dB offsets of each output.

Figure 4A:
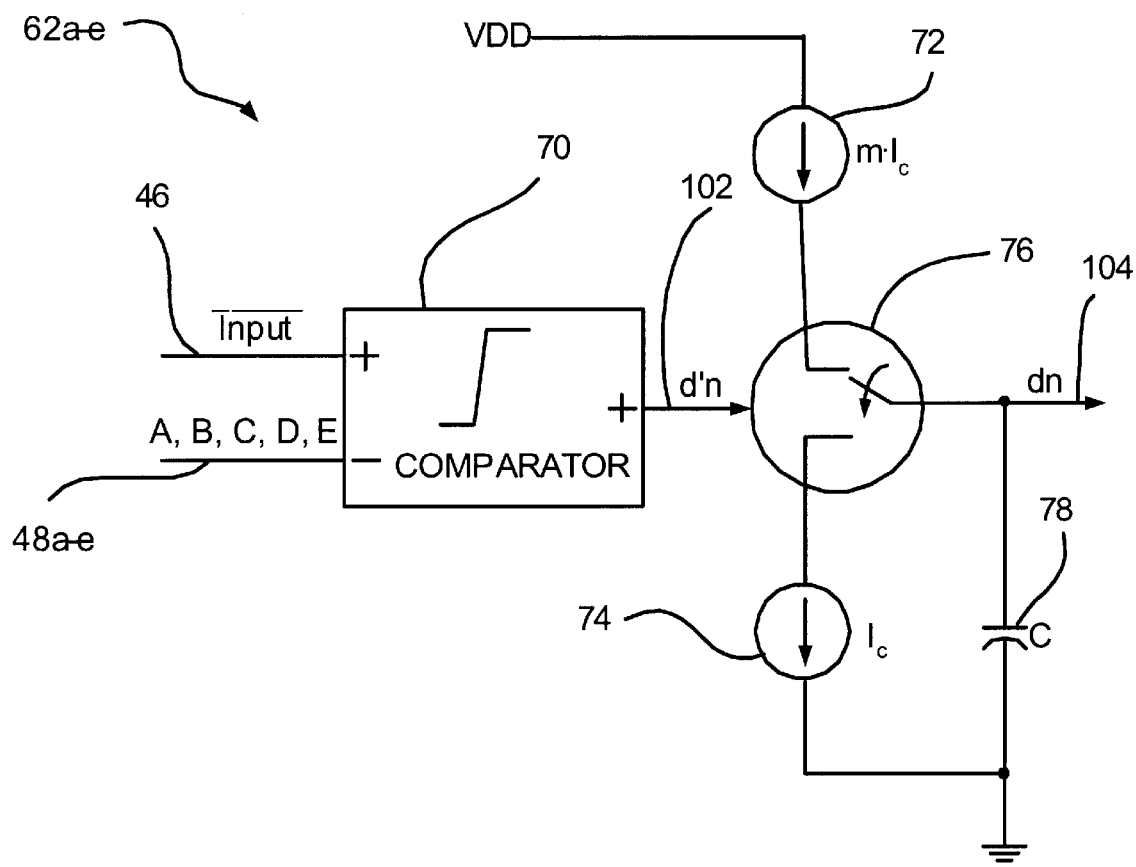
FIGS. 4a and 4b illustrates operation of the weighted comparator circuit of the rectifier of the RSSI of the present invention.
Figure 4B:
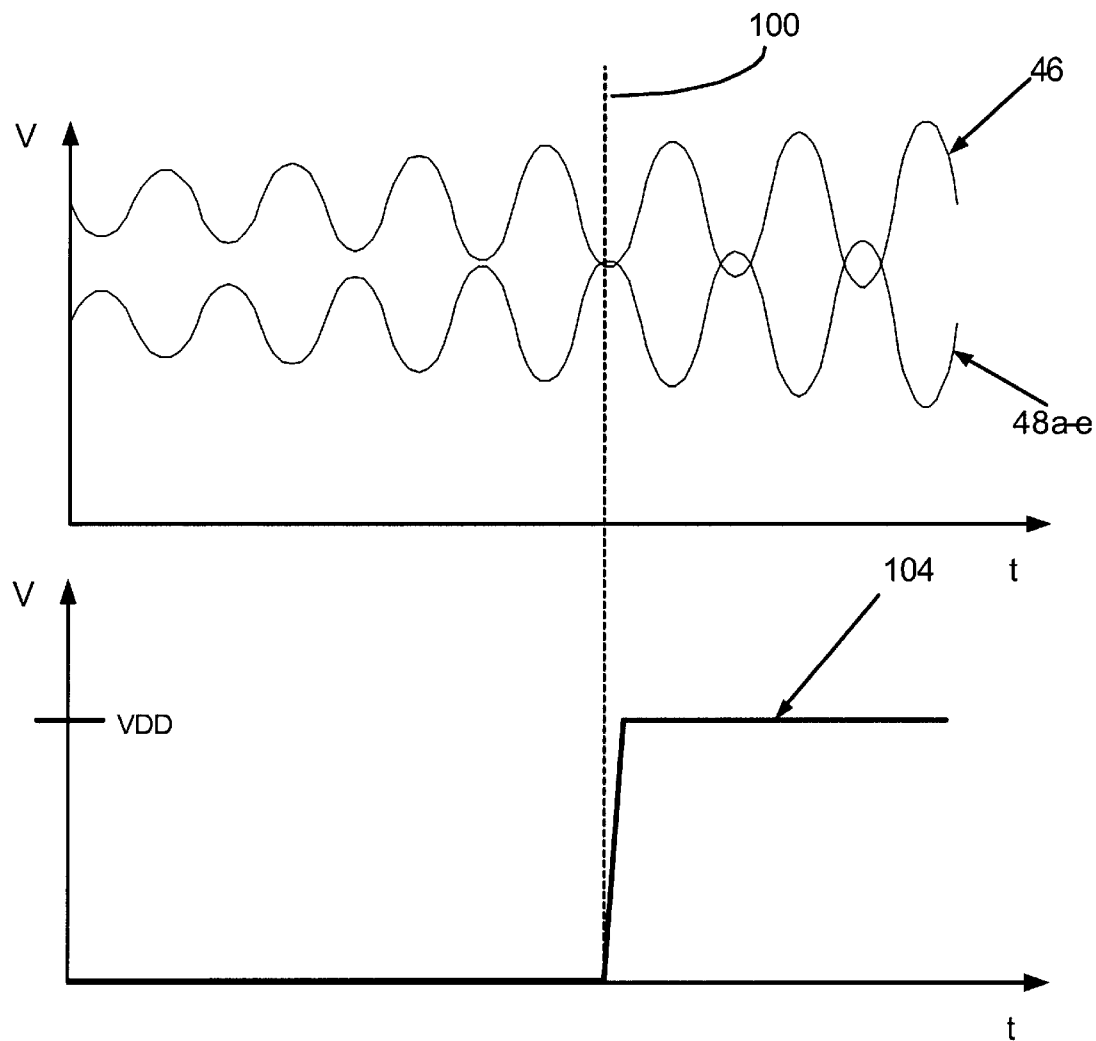

Each output 48a–e from the resistor ladder 48 is fed into the negative input of a weighted comparator circuit 62a–e respectively as illustrated in FIG. 3b. The positive input of each weighted comparator is coupled to the negative polarity of the received input signal 46, to which no offset has been applied. A more detailed representation of one embodiment of the weighted comparator 62a–e is shown in FIG. 4a. The inputs as previously described are received by a comparator circuit 70 that is inactive low at all times unless the offset input 48a–e at the comparator's negative input exceeds the level of the signal 46 of opposite polarity having no offset at the comparator's positive input, at which time the output of the weighted comparator [d0–d4] becomes active with a relatively high slew rate. FIG. 4b illustrates the point 100 at which this occurs. As the amplitude of the received input signal increases, the amplitude of the two signals of opposite polarity 46, 48 eventually overcome the offset created by the resistor ladder 48. The point 100 where the two signals of opposite polarity overlap, the received input signal has an amplitude greater than the offset.

The output (d'n) 102 of the comparator 70 is then fed into transistor switch 76. When the output 102 of comparator 70 is inactive low, the switch 76 couples current source 74 to output dn 104, and drains capacitor 78 to ground to create an inactive low output at dn 104. When the output 102 of comparator 70 becomes active high, the switch 76 couples current source 72 to output 104, causing capacitor 78 to charge up to VDD, creating an active high at output dn 104. In one embodiment, current source 72 provides m times the magnitude of current provided by source 74. This provides some hysteresis to eliminate fluctuations at output 104 in the presence of noise when the two signals being compared at the inputs are close to being equal.

Thus, as the received signal strength increases, the outputs of the weighted comparators begin producing active highs for all of the offsets that have been overcome by the amplitude of the signal, indicating that the amplitude of the received signal is greater than the accumulated offset (in dB) of all of the weighted comparators producing an active high output In the embodiment of FIG. 1, it can be seen that rectifier sub-circuit 24 provides the least significant bits representing the bottom half of the dynamic range of interest. Signals in the bottom half of the dynamic range will begin exceeding the thresholds first because the received signal has been amplified by amplifier 20. As the received signal strength increases into the top half of the dynamic range, all of output bits d0–d4 of rectifier sub-circuit 24 will be active, and output bits from rectifier sub-circuit 22 will begin to become active. As previously discussed with respect to FIG. 1, in one embodiment, this thermometer coded output 25 is then translated into a binary representation of the received signal strength, which can then be used to control other components based on the binary representation 47 of the signal strength through encoder 26. As previously discussed, the received signal strength can be used to control many facets of a network system, including to increase/decrease the gain of a sending transceiver's transmitter, or to hand off to a more proximate cell of a wireless telephone system as the received signal strength decreases.

Those of skill in the art will recognize that the RSSI of the present invention may be extended to cover greater or lesser dynamic range, or to increase the resolution of the measured signal strength, simply by adding additional rectifier stages and/or amplifiers 20, and adjusting the values of the resistor ladder networks 48 in the rectifier stages, and the gain of the amplifiers 20. Moreover, the values of current sources 72 and 74, as well as the capacitor 78 may be adjusted to alter the time constant of the output of the weighted comparator as required for a particular application using well-known principles. Additionally, an offset could also be added to the signal of the second polarity as well as the first because it is the relative difference in amplitude that detects the received signal strength. Finally, the foregoing embodiments of the RSSI of the invention are intended to be exemplary only. Other known circuit techniques for implementing the RSSI of the invention may be employed without deviating from the intended scope of the invention.

What is claimed is:

1. A method of measuring the strength of a received signal that is an AC signal having a dynamic range, said method comprising:
    converting the received signal to a first polarity of the received signal and to a second polarity of the received signal;
    generating a plurality of DC offsets of increasing value;
    imposing each of the plurality of DC offsets on the first polarity of the received signal to produce a plurality of DC offset first polarity received signals;
    comparing each of the plurality of DC offset first polarity received signals to the second polarity of the received signal;
    determining when one or more of the plurality of DC offset first polarity received signals is overcome by the second plurality of the received signal; and
    indicating the strength of the received signal based upon which of the plurality of DC offset first polarity received signals is overcome by the second plurality of the received signal.

2. The method of claim 1 wherein a DC offset polarity received signal is overcome by the second plurality of the received signal when voltage peaks of the DC offset polarity received signal and of the second plurality of the received signal overlap.

3. The method of claim 2 wherein the plurality of DC offsets increase by a step increment equal to the total dynamic range of the received signal in dB divided by the number of the plurality of DC offsets.

4. The method of claim 2 wherein the plurality of DC offsets is divided into two or more portions, said method further comprising amplifying the received signal for at least one of the portions.

5. The method of claim 3 wherein the plurality of DC offsets is divided into a first half of DC offsets starting with a DC offset of smallest magnitude and increasing by the step increment and a second half of DC offsets ending with a DC offset of the greatest magnitude, said method further comprising amplifying the received signal for the first half of DC offsets.

6. The method of claim 1 further comprising down-converting the received signal from an RF to an IF signal before said imposing each of the plurality of DC offsets.

7. The method of claim 1 further comprising programmably amplifying the received signal prior to imposing each of the plurality of DC offsets to adjust for variations in gains of processing components.

8. The method of claim 1 further comprising:
determining an indication of the strength of the received signal based upon a largest one of the plurality of DC offset first polarity received signals overcome by the second plurality of the received signal; and
converting the indication of the strength of the received signal to a binary-coded representation of the indication.

9. An apparatus for measuring the strength of a received signal that is an AC signal having a dynamic range, said apparatus comprising:
means for converting the received signal to a first polarity of the received signal and to a second polarity of the received signal;
means for generating a plurality of DC offsets of increasing value;
means for imposing each of the plurality of DC offsets on the first polarity of the received signal to produce a plurality of DC offset first polarity received signals;
means for comparing each of the plurality of DC offset first polarity received signals to the second polarity of the received signal;
means for determining when one or more of the plurality of DC offset first polarity received signals is overcome by the second plurality of the received signal; and
means for indicating the strength of the received signal based upon which of the plurality of DC offset first polarity received signals is overcome by the second plurality of the received signal.

10. The apparatus of claim 9 wherein a DC offset polarity received signal is overcome by the second plurality of the received signal when voltage peaks of the DC offset polarity received signal and the second plurality of the received signal overlap.

11. The apparatus of claim 10 wherein the plurality of DC offsets increase in value by a step increment in dB equal to the total dynamic range of the received signal in dB divided by the number of the plurality of DC offsets.

12. The apparatus of claim 10 wherein the plurality of DC offsets is divided into two or more portions, said apparatus further comprising means for amplifying the received signal for at least one of the portions.

13. The apparatus of claim 11 wherein the plurality of DC offsets is divided into a first half of DC offsets starting with the DC offset of smallest magnitude and increasing by the step increment and a second half of DC offsets ending with a DC offset of a greatest magnitude, said apparatus further comprising means for amplifying the received signal for the first half of DC offsets.

14. The apparatus of claim 9 further comprising means for down-converting the received signal from an RF to an IF signal before said imposing of the plurality of DC offsets.

15. The apparatus of claim 9 further comprising means for programmably amplifying the received signal prior to imposing the plurality of DC offsets to adjust for variations in gains of processing components.

16. The apparatus of claim 9 further comprising:
means for determining an indication of the strength of the received signal based upon a largest one of the plurality of DC offset first polarity received signals overcome by the second plurality of the received signal; and
means for converting the indication of the strength of the received signal to a binary-coded representation of the indication.

17. An apparatus for measuring the strength of a received signal that is an AC signal having a dynamic range, said apparatus comprising:
a circuit that converts the received signal to a first polarity of the received signal and to a second polarity of the received signal;
a rectifier circuit, said rectifier circuit further comprising:
an offset circuit having an input for receiving the first polarity of the received signal and for producing a plurality of DC offset first polarity received signals using a plurality of DC offsets of increasing value; and
a plurality of comparator circuits each having a first input for receiving a respective one of the plurality of DC offset first polarity received signals, a second input for receiving the second polarity of the received signal, and an output that is inactive when the amplitude of the signal on the second input is greater than the amplitude of the signal on the first input and active when the amplitude of the signal on the first input is greater than the amplitude of the signal on the second input; and
wherein the strength of the received signal is thereby indicated by the active outputs of the comparators.

18. The apparatus of claim 17 wherein the plurality of DC offsets increase by a step increment equal to the total dynamic range of the received signal in dB divided by the number of the plurality of DC offsets.

19. The apparatus of claim 18 wherein the offset circuit is a resistor ladder network.

20. The apparatus of claim 18 wherein the rectifier circuit is divided into two or more rectifier sub-circuits each having its own offset sub-circuit that generates a portion of the plurality of DC offsets, and each rectifier circuit further having a portion of the plurality of comparators; and wherein the first polarity of the received signal coupled to the offset sub-circuit of at least one of the rectifier sub-circuits, and the second polarity of the received signal coupled to the second input of the at least one rectifier sub-circuit's portion of the comparators both being amplified by a predetermined gain.

21. The apparatus of claim 17 wherein the received signal is down-converted from an RF signal to an IF signal before being received by the rectifier circuit.

22. The apparatus of claim 17 wherein the outputs of the plurality of comparators are coupled to a decoder circuit for converting the indication of received signal strength from thermometer encoding to binary encoding.

* * * * *